US012797971B2

(12) United States Patent
Krispis

(10) Patent No.: US 12,797,971 B2
(45) Date of Patent: Nov. 17, 2026

(54) MINIATURE INTERNAL BORING TOOL

(71) Applicant: ISCAR, LTD., Tefen (IL)

(72) Inventor: Ortal Krispis, Akko (IL)

(73) Assignee: Iscar, Ltd., Tefen (IL)

( * ) Notice: Subject to any disclaimer, the term of this patent is extended or adjusted under 35 U.S.C. 154(b) by 598 days.

(21) Appl. No.: 18/458,206

(22) Filed: Aug. 30, 2023

(65) Prior Publication Data

US 2025/0073789 A1 Mar. 6, 2025

(51) Int. Cl.
*B23B 29/02* (2006.01)
*B23B 51/00* (2006.01)

(52) U.S. Cl.
CPC ............ *B23B 51/011* (2022.01); *B23B 29/02* (2013.01); *B23B 2250/12* (2013.01); *B23B 2270/30* (2013.01)

(58) Field of Classification Search
CPC ..... B23B 27/007; B23B 29/02; B23B 51/011; B23B 2270/30; B23B 2270/60
See application file for complete search history.

(56) References Cited

U.S. PATENT DOCUMENTS

2011/0243674 A1* 10/2011 Kitagawa .............. B23B 27/007 408/199
2013/0309027 A1* 11/2013 Chistyakov ........... B23B 29/043 407/102
2016/0082519 A1* 3/2016 Hecht ..................... B23B 27/04 407/100
2022/0111447 A1* 4/2022 Hecht ................. B23B 27/1622

FOREIGN PATENT DOCUMENTS

DE 10 2004 013 835 A1 10/2005
DE 10 2015 104 057 A1 9/2016
DE 202017000310 U1 * 2/2017 ........... B23B 27/007
EP 1762320 A2 * 3/2007 ............. B23B 29/02
EP 3 954 482 A1 2/2022
GB 2122124 A * 1/1984 ............. B23B 51/04

OTHER PUBLICATIONS

International Search Report dated Dec. 23, 2024, issued in PCT counterpart application No. PCT/IL2024/050752.
Written Opinion dated Dec. 23, 2024, issued in PCT counterpart application No. PCT/IL2024/050752.
Picco R 050.20: Inserts for internal turning and chamfering next to the bottom of blind holes, retrieved Aug. 30, 2023, https://www.iscar.com/eCatalog/Family.aspx?/num=3177&mapp=TG&app=0&GFSTYP=M&fr=1.
PICCO/MG PCO (Holder): Holders for PICCO-Cut Inserts and Small Diameter Boring Bars, retrieved Aug. 30, 2023, https://www.iscar.com/eCatalog/Family.aspx?fnum=514&mapp=TG&app=0&GFSTYP=M&fr=1.

* cited by examiner

*Primary Examiner* — Nicole N Ramos

(74) *Attorney, Agent, or Firm* — Womble Bond Dickinson (US) LLP

(57) ABSTRACT

A miniature internal boring tool including two to four shank flat surfaces and two to four integrally formed teeth. The outermost points of cutting edges of the teeth define an outer cutting diameter (OD) fulfilling the condition: 2 mm<OD<9 mm.

21 Claims, 5 Drawing Sheets

MINIATURE INTERNAL BORING TOOL

FIELD OF THE INVENTION

The subject matter of the present application relates to a miniature internal boring tool (hereinafter also referred to as "tool" for succinctness).

BACKGROUND OF THE INVENTION

Internal boring tools enter a cavity (typically a cylindrical bore) of a rotating workpiece and form a groove or thread.

By "miniature" it is meant that the present application is directed to boring tools having an outer cutting diameter of less than 9 mm.

It will be understood that with such tiny outer cutting diameters for tools designed to be inside tiny bores, design issues arise that do not exist with other tools. For example, balancing rigidity of the tool against the need for chip evacuation is a critical consideration.

Accordingly, the applicant has successfully sold for many years a tool marketed under the name "Piccocut" (one example of which is designated the Picco R 050.20.3-10; https://www.iscar.com/eCatalog/Family_aspx?fnom=3177&mapp=TG&app=0&GFSTYP=M&fr=1), hereinafter called the "prior art example tool", and described in detail below and in the drawings.

The present application is directed to an improvement of the prior art example tool, with some common features noted below.

The prior art example tool and the tool according to the present invention are primarily operated by moving, in a forward direction, a forwardmost cutting sub-edge and nose cutting sub-edge of a tooth into an internal surface of a bore of a rotating work piece. Such tools can also be used to widen an existing bore, or, with a typically slightly different tooth geometry to that shown in the present drawings, produce a thread. Due to the geometry of such tools, they are not typically used for machining in a rearward direction.

Notably, unlike many other tool types, the prior art example tool and the present invention have shank portions with shank flat surfaces used for highly-precise positioning of their cutting edges. Said positioning facilitates a so called "plug and play" clamping of the tool in corresponding prior art tool holders without a need to manually position the cutting edges. Notably, the shank portions and shank flat surfaces are designed so that the tool of the present application can be used in the same holders as the prior art tools (e.g. the "Passcut", https://www.iscar.com/eCatalog/Family.aspx?fnum=514&mapp=TG&app=0&GFSTYP=M&fr=1).

Generally speaking, comparative features of the prior art tool having letters will be suffixed with the numeral "2" for ease of review (or "3" if there is an additional element). For example, the neck length of the present invention is designated "$L_N$", consequently the comparative neck length of the prior art tool will be designated "$L_{N2}$". Additionally, comparative features of the prior art tool having numerals only will be shifted by "100" for ease of review. For example, the tool of the present invention is designated "10" the comparative prior art tool is designated "110".

SUMMARY OF THE INVENTION

The prior art tool has been a popular tool on the market for many years, the present invention is intended to be an improvement thereof.

In accordance with a first aspect of the subject matter of the present application, there is provided a miniature internal boring tool comprising a shank portion and a cutting portion; the shank portion comprising two to four shank flat surfaces; the cutting portion comprising two to four integrally formed outwardly extending teeth; each tooth comprising a cutting edge; and outermost points of the cutting edges in the outer direction define an outer cutting diameter $O_D$ fulfilling the condition: 2 mm<$O_D$<9 mm.

The above description is the basic concept of the invention, namely a miniature tool defined with a tiny outer cutting diameter. The tool being configured for internal boring, as indicated by the shank flat surfaces use to position a cutting edge of a single tooth in a high precision manner for boring, such positioning not being needed for tools configured for rotating cutting action. Further, the tool now has a significant advantage over the prior art tool described above, namely that it now has more than one tooth, substantially extending the overall tool life of the tool.

While increasing the number of teeth of a cutting tool is a known benefit, this has never been done, to the best of the knowledge of the applicant, for miniature internal boring tools, and for good reason. The reason being that inside a tiny bore there is extremely limited space for chip evacuation, and reduction of the material of the cutting portion reduces constructional strength (hence increasing vibration of the tool and worsening performance thereof). Therefore, there is a need to maintain a careful balance of material and chip evacuation space.

It will be understood that in the specification and claims, where it is stated "two to four teeth" this language is intended to exclude one tooth and also excludes five or more teeth. This is also true for other elements limited with similar language.

The present invention was tested and found to have sufficient constructional strength and also acceptable chip evacuation.

In the most preferred embodiment the tool has three teeth. While four teeth is even more desirable, it was not believed that acceptable performance or chip evacuation would be achieved at least for the lower sizes of the outer cutting diameter $O_D$ fulfilling the condition: 2 mm<$O_D$<6 mm.

In accordance with a second aspect of the subject matter of the present application, there is provided a miniature internal boring tool comprising: a shank portion; a cutting portion extending from the shank portion; and a central axis extending through the center of the shank portion and cutting portion; the central axis defining: a cutting direction; a forward direction from the shank portion towards the cutting portion; a rearward direction opposite to the forward direction; an outward direction extending perpendicular to, and outward from, the central axis; and an inward direction opposite to the outward direction; the shank portion comprising: a rear end; and a peripheral shank surface extending from the rear end to the cutting portion; the peripheral shank surface comprising: two to four shank flat surfaces; and two to four shank curved surfaces; the shank flat surfaces and the shank curved surfaces alternating about the central axis; the cutting portion comprising: a neck portion extending from the shank portion to the cutting portion; a gashed portion extending forward from the neck portion; a front end; and an imaginary plane perpendicular to the central axis and located at the front end; the gashed portion comprising: two to four integrally formed and angularly spaced apart teeth extending further in the outward direction than the neck portion; and a plurality of gashes; each tooth comprising: a rake surface; a relief surface; a cutting edge extending along an intersection of the rake surface and relief surface; and the relief surface comprising: a forwardmost relief sub-surface; and a rearwardmost relief sub-surface; the cutting edge comprising: a forwardmost cutting sub-edge extending along the intersection of the rake surface and forwardmost relief sub-surface; a rearwardmost cutting sub-edge extending along the intersection of the rake surface and rearwardmost relief sub-surface; and a nose cutting sub-edge connecting the forwardmost cutting sub-edge and the rearwardmost cutting sub-edge; a transition corner is formed between the rake surface of at least one of the teeth and the relief surface of the adjacent tooth to said at least one of the teeth, said adjacent tooth being located further in the cutting direction from said rake surface; wherein: outermost points of the cutting edges in the outer direction define an outer cutting diameter ($O_D$) fulfilling the condition: 2 mm<$O_D$<9 mm.

It will be understood that the outward direction could also be called an outward radial direction, and the inward direction could also be called an inward radial direction, and for the sake of succinctness they are called herein by the shorter names of “outward direction” and “inward direction”.

This aspect is generally similar to the prior aspect, yet with a more detailed description of the tool given. One notable addition is the addition of the central axis extending through the center of the shank portion and cutting portion which is a differentiating feature over the prior art tool as shown in the drawings. The prior art tool benefited from a simplified production process (there being no need to grind a curved surface designated “127” (FIG. 10) of a neck portion which extends flush with the shank) by being off-center, however the present invention forgoes this advantage for other advantages achieved by the additional teeth thereof.

In accordance with a third aspect of the subject matter of the present application, there is provided a miniature internal boring tool comprising: a shank portion and a cutting portion; the shank portion comprising a shank flat surface; the cutting portion comprising an integrally formed outwardly extending tooth comprising: a rake surface; a relief surface; and a cutting edge extending along an intersection of the rake surface and relief surface; in a view perpendicular to the rake surface, a forwardmost cutting sub-edge of the tooth subtends an external attack angle $A_E$ with an imaginary plane PI, fulfilling the condition: 4°<$A_E$<16°; and outermost points of the cutting edges in the outer direction define an outer cutting diameter ($O_D$) fulfilling the condition: 2 mm<$O_D$<9 mm;

This aspect differs in a particularly beneficial cutting edge construction was discovered during development, which is elaborated on below. Accordingly, this aspect is not limited to a plurality of teeth in contradistinction to the previous aspects. It will be understood that this aspect can further include any or all of the features described above in relation to the previous aspects, and below stated generally.

It will also be understood that the above-said is a summary, and that any of the aspects above may further comprise any of the features described hereinbelow. Specifically, the following features may be applicable to any one of aspect 1 to 3 above:

A. A tool can comprise a central axis extending through the center of the shank portion and cutting portion. This configuration is disadvantageous for a single tooth embodiment of the prior art but is offset by the benefit of multiple teeth according to the present invention.

B. A peripheral shank surface can preferably comprise two to four shank flat surfaces. It will be understood that a cylindrical peripheral shank surface is used for many other tools since it provides the most accuracy, in particular in terms of runout. However, since it is not impossible to determine a way to position the cutting edges as needed, it must be pointed out that this feature is not essential. Nonetheless, for internal boring purposes, precise positioning of the cutting edge to be used (hereinafter also called an “operative cutting edge”) is required and therefore shank flat surfaces are certainly highly preferred. Preferably there is one shank flat surface for each tooth, however it is not inconceivable that this number may differ, depending on the tool holder (not shown) designed to hold the tool.

C. Preferably, shank flat surfaces extend until the rear end. It should be understood that the shank flat surfaces are not the well-known, so-called, Weldon flats. The present invention relates to miniature tools measured in millimeters, and screws designed to hold them are accordingly tiny, but are still relatively large compared to the miniature tools. To exemplify, a shank flat surface length $L_F$ of the present invention can be at least 30% of a shank length $L_S$ ($L_F$≥0.3 $L_S$), preferably at least 50% ($L_F$≥0.5 $L_S$), and most preferably at least 80% ($L_F$≥0.8 $L_S$). This is clearly different from the relatively small Weldon flats, at least small comparative to the shanks they are formed on. For similar reasoning, the shank flats are very large relative to Weldon flats. Stated differently, a shank flat surface width WF can be longer than a width of an adjacent shank curved surface.

D. Preferably, one of each shank flat surface and an axially aligned one of each rake surface of one of the teeth forms a pair and said pair extends at a right angle to each other.

E. Preferably, shank curved surfaces alternate with shank flat surfaces.

F. Preferably the shank curved surfaces are cylindrically-shaped surfaces.

G. A plurality of gashes can be two to four gashes, but not need be, as will be understood in the prior art wherein a single tooth is associated with two gashes. Nonetheless, preferably, a number of gashes corresponds exactly the total number of teeth of the tool. To clarify, in the prior art tool, a single tooth has two separately formed gashes, which is less preferred than a single gash per tooth. While a helically extending gash is feasible and was initially tested, better machining results were found with a non-helical or, stated differently, planar gash.

H. Despite concerns over sufficient chip evacuation, it was found that a relatively short gash (comparative to the prior art tool) provided sufficient chip evacuation even though it was initially thought that a longer gash would be needed. To exemplify, a gash length $L_G$ of the present invention can be less than 35% of a neck length $L_N$ ($L_G$<0.35 $L_N$), preferably less than 25% ($L_G$<0.25 $L_N$), and most preferably less than 22% ($L_G$<0.22 $L_N$). This is clearly different from the prior art tool which has a gash length $L_{G2}$ of approximately 58% of the neck length $L_{N2}$ thereof. While a smallest gash length $L_G$ has not been tested, it was found advantageous to produce a gash with a gash length $L_G$ fulfilling the condition 0.12 $L_N$<$L_G$<0.22 $L_N$. Alternatively defined, it was found advantageous to produce a gash with a gash length $L_G$ fulfilling the condition 1 mm<$L_G$<2.2 mm, more preferably 1.3 mm<$L_G$<1.9 mm.

I. Preferably, the two to four of shank flat surfaces and two to four teeth are exactly three shank flat surfaces and exactly three teeth. As stated above, this is more beneficial than two teeth, but less beneficial than four teeth, however given the limitations of the machining application and space available, it is believed to be the most optimal number of teeth, at the very least for the outer cutting diameter ($O_D$) fulfilling the condition: 2 mm<$O_D$<6 mm.

J. A shank portion can have one or more coolant slots. Preferably there is one coolant slot for each cutting edge. Preferably, the coolant slots are axially aligned with a corresponding cutting edge. Preferably, the coolant slot breaches the shank portion to extend into the neck portion.

K. Outermost points of the cutting edges in the outer direction define an outer cutting diameter ($O_D$). Preferably, the outermost points are located on the nose cutting sub-edges of the cutting edges.

L. In a view perpendicular to the rake surface of one of the teeth, the forwardmost cutting sub-edge of that tooth can extend in the forward direction and preferably subtends an external attack angle $A_E$ with the imaginary plane PI, fulfilling the condition: 4°<$A_E$<16°. This angle was designed to increase structural strength, over the prior art tool, during machining in a forward direction as described above, in the typical machining of a miniature internal boring tool. Testing was successful for the relatively smaller external attack angle $A_E$. A preferred external attack angle $A_E$ is within the range: 6°<$A_E$<12°, with more preferred angles being within the range: 6°<$A_E$<10°.

M. The outer cutting diameter ($O_D$) fulfills the condition: 2 mm<$O_D$<9 mm, which is how "miniature" is defined for the purposes of the present application. It will be understood that certain features are more beneficial for the smaller outer cutting diameter ($O_D$) where a balance between competing considerations of structural strength and chip evacuation space becomes more critical. Preferably outer cutting diameter ($O_D$) fulfills the condition: 2 mm<$O_D$<6 mm, and more preferably 2.5 mm<$O_D$<4 mm.

N. A rake surface can comprise: a front rake sub-surface extending between a forwardmost cutting sub-edge, a rearwardmost cutting sub-edge and a nose cutting sub-edge; a concave rake sub-surface, extending from and further in the inward direction from the front rake sub-surface; and a rear rake sub-surface extending from and further in the inward direction from the concave rake sub-surface.

O. In a view along the central axis in the rearward direction (e.g. the view corresponding to FIG. 11), a rear rake sub-surface preferably extends in a basic straight path to a transition corner of a tooth adjacent thereto. It will be understood that this allows more chip evacuation space than if a rear rake sub-surface would have a convex shape or hump (as is typical for rotating tools for, inter alia, the purposes of momentum).

P. A transition corner can be formed between a rake surface of one of the teeth and a relief surface of another one of the teeth located further in the cutting direction from said rake surface. In a view along the central axis in the rearward direction, a transition corner can be a sharp corner. Stated differently, the transition corner is devoid of a convex shape. Alternatively stated, a sharp corner is a discontinuity.

Q. The tool can comprise exactly three shank flat surfaces and exactly three teeth, wherein in a view along the central axis in the rearward direction, at the front end coinciding with the imaginary plane, a void area $A_V$ defined between two adjacent cutting edges and bounded by a circular segment SC defined by the outer cutting diameter Op can fulfill the condition: 0.1 $O_D$<$A_V$<0.25 Op, preferably 0.12 $O_D$<$A_V$<0.22 $O_D$, and most preferably 0.14 $O_D$<$A_V$<0.20 $O_D$.

R. The neck portion can have a basic cylindrical cross section (except where it transitions from the shank portion). The neck portion can have a neck length $L_N$.

S. The tool can be rotationally symmetric. The tool can be 120° rotationally symmetric.

T. A chip evacuation angle θ, measurable between a front rake sub-surface and a rear rake sub-surface, is preferably an obtuse angle, to provide chip evacuation space. In embodiments with three teeth it more preferably fulfills the condition 95°≤θ≤125°, and most preferably fulfills the condition 110°≤θ≤120°, bearing in mind that chip evacuation space needs to be maximized while still being restricted by the area occupied by multiple teeth.

BRIEF DESCRIPTION OF THE DRAWINGS

For a better understanding of the subject matter of the present application, and to show how the same may be carried out in practice, reference will now be made to the accompanying drawings, in which.

DETAILED DESCRIPTION

Referring to FIGS. 1 to 4, there is shown a miniature internal boring tool 10 comprising a shank portion 12 and a cutting portion 14.

A central axis $A_C$ extends through the center of the shank portion 12 and cutting portion 14.

Figure 1:
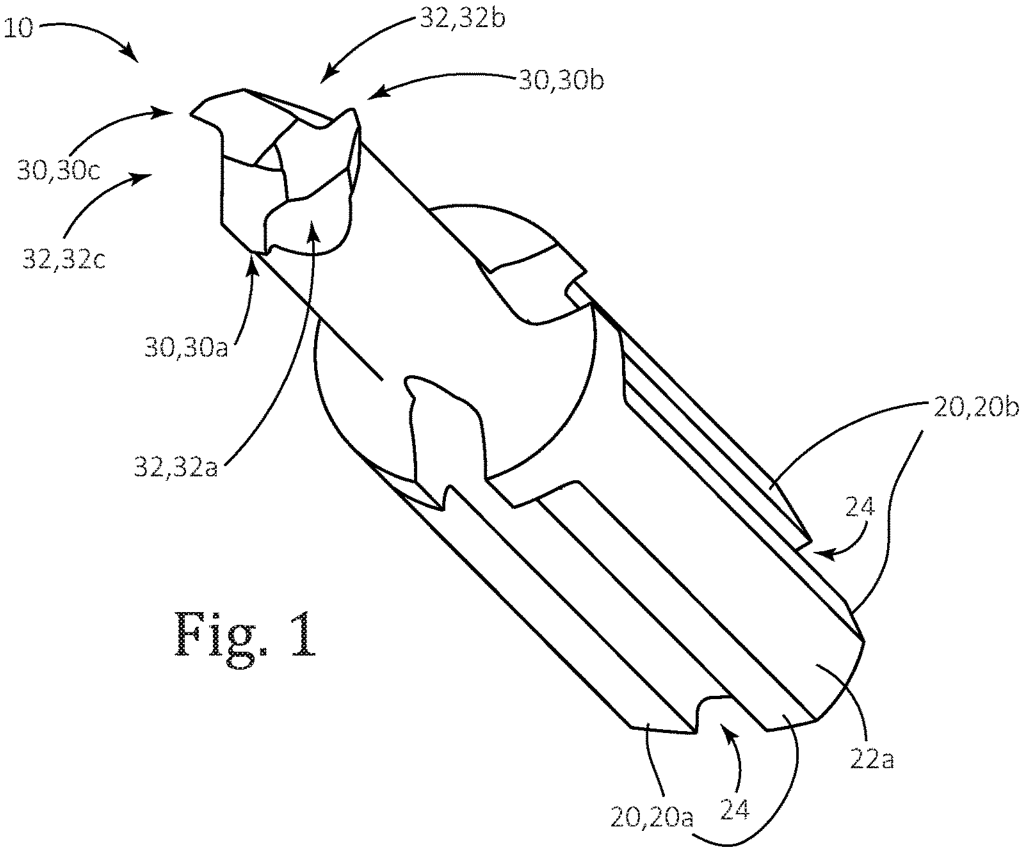
FIG. 1 is a perspective view of a tool according of the present invention.
Figure 2:
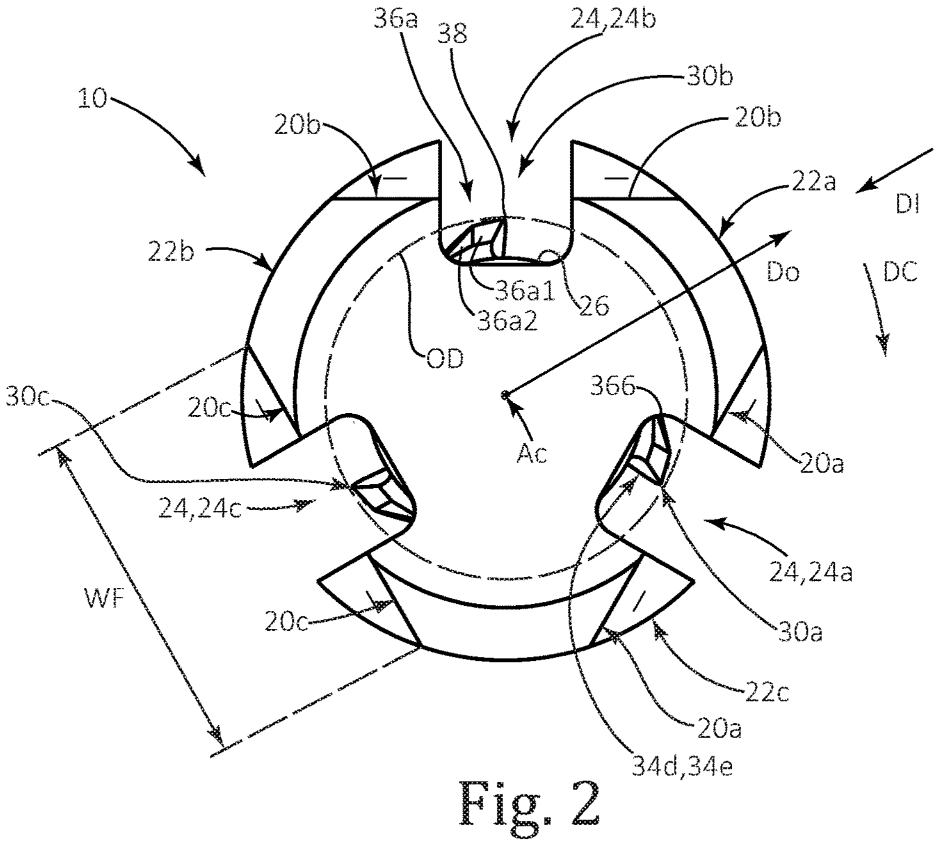
FIG. 2 is a rear end view, along a central axis $A_C$, of the tool in FIG. 1.
Figure 3:
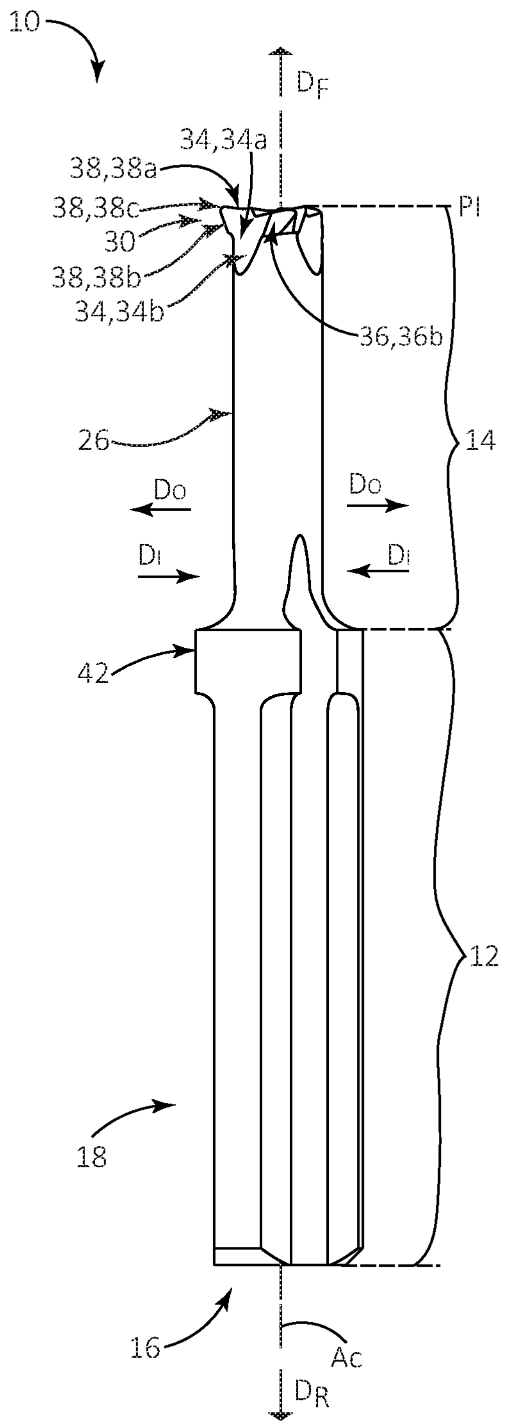
FIG. 3 is a side view of the tool in FIG. 1, in a view perpendicular to a rake surface of a left tooth.
Figure 4:
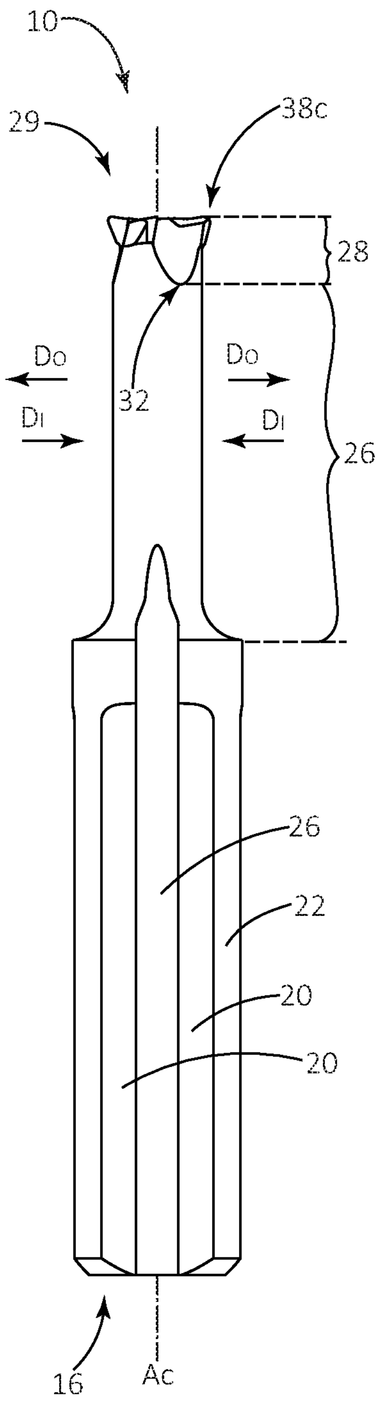
FIG. 4 is side view of the tool, similar to FIG. 3, except with the tool rotated 90 degrees such that the cutting edge of the left tooth in FIG. 3 is now centrally located.

The central axis $A_C$ defines a cutting direction $D_C$, a forward direction $D_F$, a rearward direction $D_R$ opposite to the forward direction $D_F$, an outward direction $D_O$ (shown best in FIG. 2, the extra arrows in FIGS. 3 and 4 are to exemplify that the outward direction $D_O$ is not a single direction but all outward directions from the central axis $A_C$) extending perpendicular to, and outward from, the central axis $A_C$, and an inward direction $D_1$ (shown best in FIG. 2, the extra arrows in FIGS. 3 and 4 are to exemplify that the inward direction $D_1$ is not a single direction but all inward directions to the central axis $A_C$) opposite to the outward direction $D_O$.

The shank portion 12 comprises a rear end 16 and a peripheral shank surface 18 extending from the rear end 16 to the cutting portion 14.

The peripheral shank surface 18 comprises three shank flat surfaces 20 (designated individually as 20*a*, 20*b*, 20*c*). For succinctness, elements below may be referred to below with the general designation, for example "20" for shank flat surfaces, instead of their individual designations 20*a*, 20*b*, 20*c*). The peripheral shank surface 18 also comprises three (preferably cylindrically-shaped) shank curved surfaces 22 (individually designated 22*a*, 22*b*, 22*c*).

While it appears that there are six shank flat surfaces 20, it will be understood that coolant slots 24 (individually designated 24*a*, 24*b*, 24*c*) formed in the shank portion 12 are optional and therefore the above indicated designated shank flat surfaces (20*a*, 20*b*, 20*c*) are pairs of shank flat sub-surfaces which are considered a single shank flat surface. In particular, they may be functionally identical (e.g. a screw from a tool holder, both not shown, is intended to simultaneously contact both shank flat sub-surfaces of a single pair, for example, the pair of shank flat sub-surfaces both designated "20*a*").

The cutting portion 14 comprises a neck portion 26, a gashed portion 28, a front end 29 and an imaginary plane PI perpendicular to the central axis $A_C$ and located at the front end 29.

The neck portion 26 has a basic cylindrical cross section (see, e.g., FIG. 2) and a neck length $L_N$ (FIG. 6), which in this very example is 8.4 mm. It should be noted, however, that the general structure, geometry and dimensional ratios of this very embodiment is not limited to the exact dimensions mentioned in the discussion of the figures but equally apply to tools having dimensions within the ranges referred to herein above.

The neck portion' cross section has a diameter ø, which in this example is 2.1 mm.

The gashed portion 28 comprises three integrally formed teeth 30 (individually designated 30*a*, 30*b*, 30*c*) and a three planar gashes 32 (individually designated 32*a*, 32*b*, 32*c*).

The tool 10 has, in this example, three teeth 30, and therefore is 120° rotationally symmetric (as the number of teeth divided by 360° is 120) about the central axis $A_C$. As the teeth 30 and the other elements are identical, the description above and below may refer to a single sub-element on one and it should be understood that this description applies to all the other identical elements. It should also be understood, that a tool according to the present invention could have minor non-identical differences such as the gashes being slightly different length without any change in efficiency. It should further be understood that the present invention does not require all elements to be identical and that this is only a preferred configuration.

Each tooth 30 comprises a rake surface 34, a relief surface 36, and a cutting edge 38.

Figure 11:
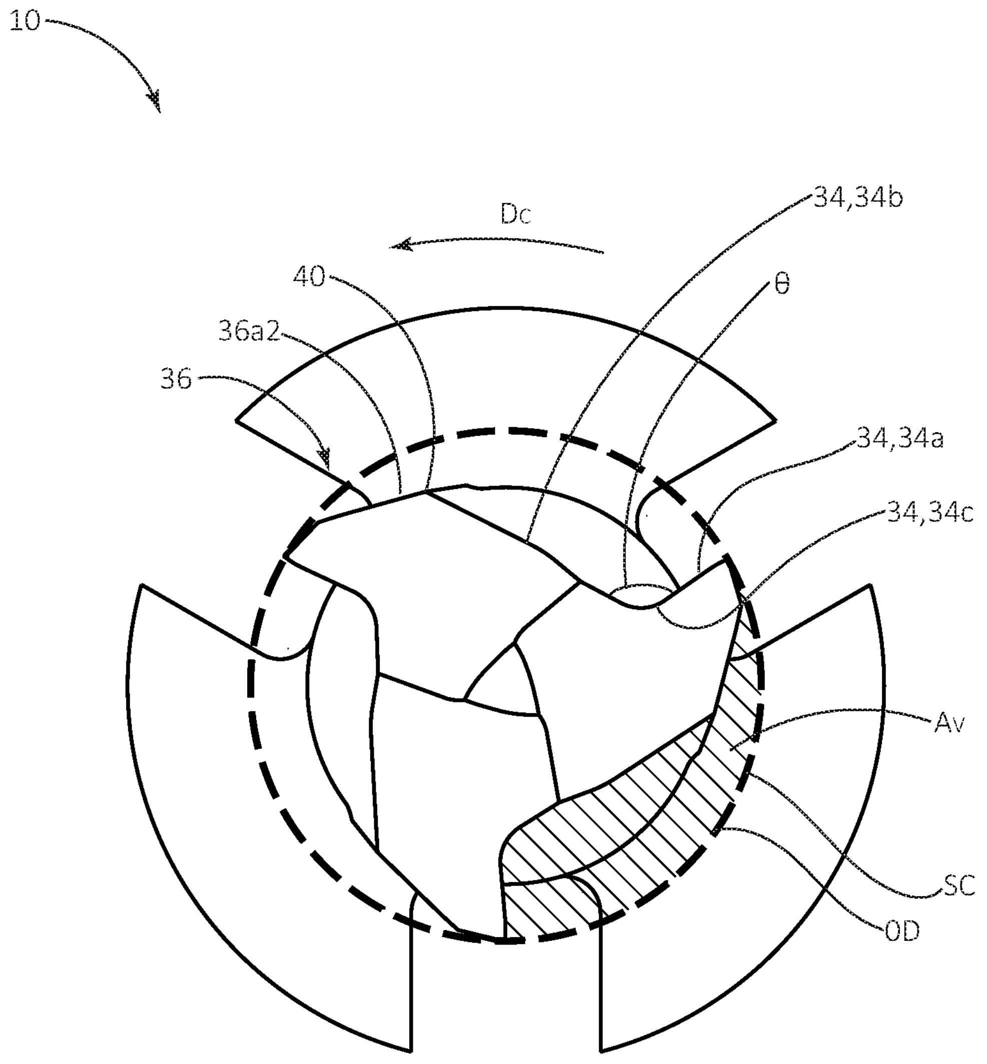
FIG. 11 is an identical view to FIG. 9, except that the dashed line in this figure indicates an outer cutting diameter and the hashed section schematically indicates a void area $A_V$, along the central axis $A_C$ and at an imaginary plane at the front end, between the cutting portion and bounded by a circular segment SC defined by the outer cutting diameter $O_D$.

Referring also to FIG. 11, the rake surface 34 can comprise: a front rake sub-surface 34*a*, a rear rake sub-surface 34*b* and a concave rake sub-surface 34*c*.

The relief surface 36 comprises a forwardmost relief sub-surface 36*a* and a rearwardmost relief sub-surface 36*b*.

A chip evacuation angle θ in this exemplary embodiment is 117°.

In this example, as best seen in FIG. 2, the forwardmost relief sub-surface 36*a* has two facets, namely a first relief facet 36*al* connected to the cutting edge 38, and a second relief facet 36*a*2 extending from the first relief facet 36*a*1.

Additionally, in FIG. 11, a sharp transition corner is designated "40" and is shown located at an intersection of one of the rake surfaces 34 and one of the relief surfaces 36 located further in the cutting direction $D_C$ than said rake surface 34. More precisely, the transition corner 40 is located at the intersection of the rear rake sub-surface 34*b* and the second relief facet 36*a*2.

Reverting to FIGS. 3 and 4, the cutting edge 38 comprises a forwardmost cutting sub-edge 38*a*, a rearwardmost cutting sub-edge 38*b* and a nose cutting sub-edge 38*c*.

In the present example, and in preferred embodiments, the nose cutting sub-edge 38*c* of all of the teeth 30 constitutes both the outermost points and forwardmost points of the tool 10. Therefore, for example, the imaginary plane PI is defined by the nose cutting sub-edges 38*c*, as they include the forwardmost points of the tool 10. Another example is that the nose cutting sub-edges 38*c* define an outer cutting diameter $O_D$ (FIG. 2), as they include the outermost points of the tool 10. In this example the outer cutting diameter ($O_D$) is 2.7 mm.

Figures 5, 6, 7, 8:
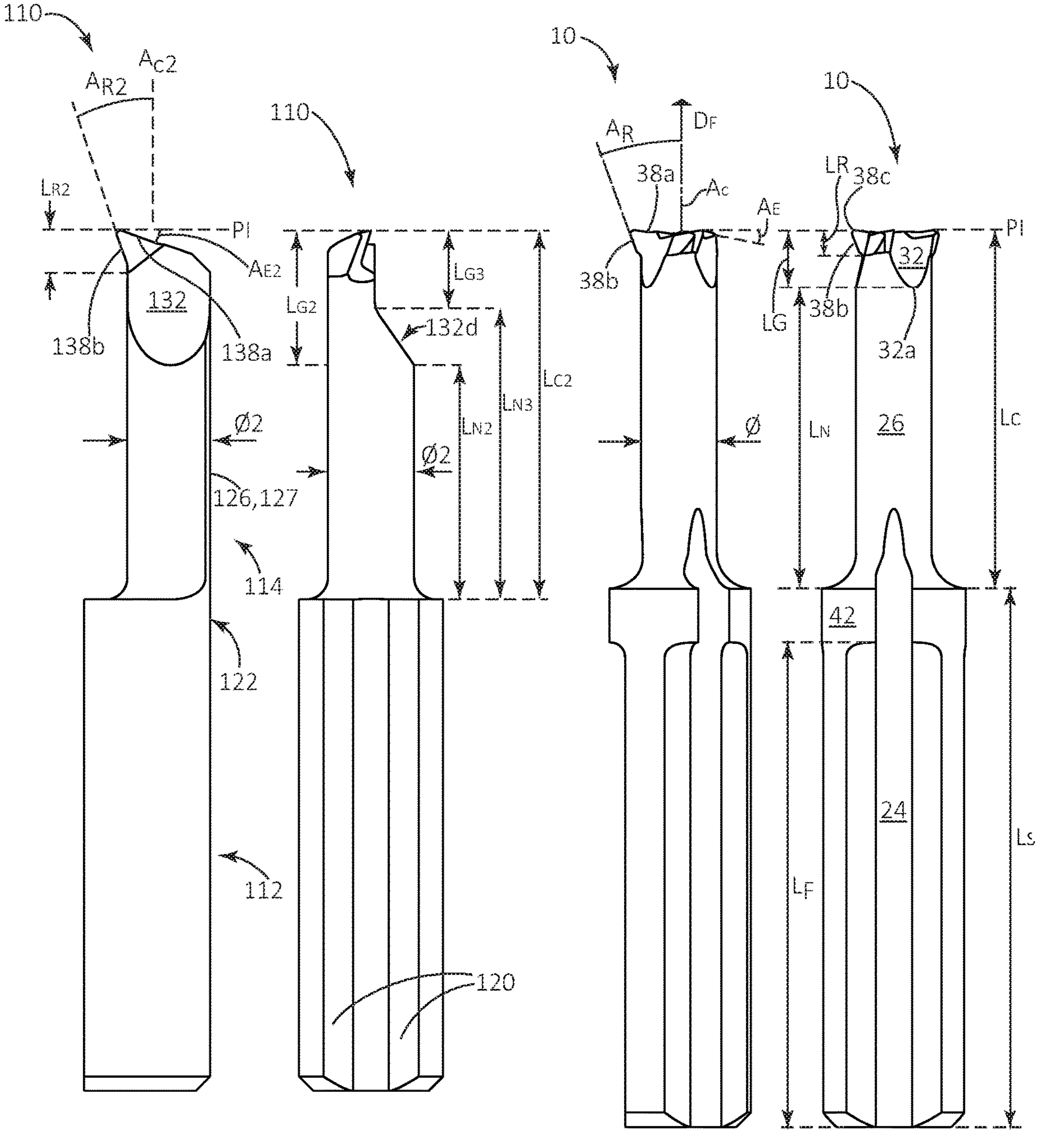
Fig. 7 PRIOR ART
Fig. 8 PRIOR ART
FIG. 5 is an identical view to FIG. 3.
FIG. 6 is an identical view to FIG. 4.
FIG. 7 is a side view of a prior art tool, in a view similar to FIG. 3, specifically in a view perpendicular to the rake surface of the left tooth.
FIG. 8 is a side view of the prior art tool in FIG. 7, in a view similar to FIG. 4, specifically with the tool rotated 90 degrees such that the cutting edge of the left tooth in FIG. 7 is now centrally located.

Drawing particular attention to FIGS. 5 and 6, the forwardmost cutting sub-edge 38*a* subtends an external attack angle $A_E$ with the imaginary plane PI, which in this example is 8°.

The rearwardmost cutting sub-edge 38*b* of the tooth subtends an external attack angle $A_R$ with the forward direction $D_F$, which in this example is 20°.

The cutting portion 14 has a cutting portion length $L_C$, which in this example is 10 mm.

Each gash 32 has a gash length $L_G$, which is defined as extending from a rearmost gash edge 32*a* to the forwardmost point of the tooth 30 with which the gash 32 is associated (in this case the forwardmost point coinciding with the imaginary plane PI or alternatively the nose cutting sub-edges 38*c* which define the imaginary plane PI). In this example the gash length $L_G$ is 1.6 mm.

The rearwardmost cutting sub-edge 38*b* has a rear edge length $L_R$, which in this example is 0.6 mm.

The shank flat surfaces 20 extend until the rear end 16 and have a shank flat surface length $L_F$, which in this example is 17.5 mm.

The shank flat surfaces 20 can have a shank flat surface width WF, which in this example is 2.6 mm.

The shank portion 12 comprises a cylindrical shank sub-portion 42 between the shank flat surfaces 20 and the neck portion 26, and has an overall shank length $L_S$, which in this example is 21 mm.

As shown in FIG. 2, the coolant slots 24 are axially aligned with a corresponding cutting edge 38. The coolant slots 24 breach the shank portion 12 to extend into the neck portion.

Each shank flat surface 20 is axially aligned with one of each rake surfaces 34 of one of the teeth, which forms a pair.

As shown in FIG. 2, to simply give an example, the shank flat surface designated 20*a* is paired with one of the rake surfaces arbitrarily given a designation of "34*d*" for exemplary purposes, thereby creating one such pair. As shown the shank flat surface 20*a* extends at a right angle to the rake surface 34*d*, specifically the front rake sub-surface (arbitrarily given a designation of "34*e*") of the rake surface 34*d*.

As shown in FIG. 11, the rear rake sub-surface 34*b* extends in a basic straight path to the transition corner 40.

Referring now to FIGS. 5 to 8 there will be a comparison with some notable differences between the prior art tool 110 in FIGS. 7 and 8 with the example tool 10 of the present invention.

In the prior art tool 110, the axis $A_{C2}$ does not extend through the center of both the shank portion 112 and the cutting portion 114.

There is a single shank flat surface 120 and a single cylindrically-shaped shank curved surface 122.

The shank curved surface 122 extends flush with a curved surface 127 of a neck portion 126, the significance of which is explained above.

The cutting portion 114 has a cutting portion length $L_{C2}$, which in this example is 10.3 mm.

The neck portion 126 has a neck length $L_{N2}$, which in this example is 6.5 mm. It will be understood that this is a comparative length for the cylindrical cross section part of the cutting portion 114. Alternatively, if including part of the gash 132, the neck portion 126 could be considered to have an alternative neck length $L_{N3}$, which in this example is 8.1 mm. Regardless, it will be understood that the tool 10 does not have a comparative gash portion arbitrarily designated 132*d* which is upwardly slanted and removes further material from the cylindrical cross sectional part of the neck portion 126.

The neck portion 126 at a basically cylindrical part thereof, has a diameter ø2, which in this example is 2.3-2.4 mm, depending on the direction of measurement.

Regardless of the direction, it should be understood that due to the inclusion of multiple teeth in the tool 10, the design resulted in a smaller diameter ø, which was a concern for stability but that was found to provide suitable performance.

More notably, the gashes 132 are significantly longer, with the comparative gash length $L_{G2}$ being 3.8 mm. Or, alternatively, even with an alternative gash length $L_{G3}$ being larger at a length of 2.2 mm.

Similarly, the rearwardmost cutting sub-edge 138*b* has a rear edge length $L_{R2}$, which is also significantly longer, equaling 0.96 mm.

The significance of the numerical comparisons brought above is that even with significantly smaller gashes and longer neck portions with a cylindrical cross section, it was surprisingly found that there was sufficient chip evacuation space and sufficient rigidity for the tool according to the present invention.

Finally, it is noted that the external attack angle $A_{E2}$ is 20°.

Despite the differences shown above, it should be noted that the tool 10 successfully provides similar material removal performance to the prior art tool 110.

Figure 9:
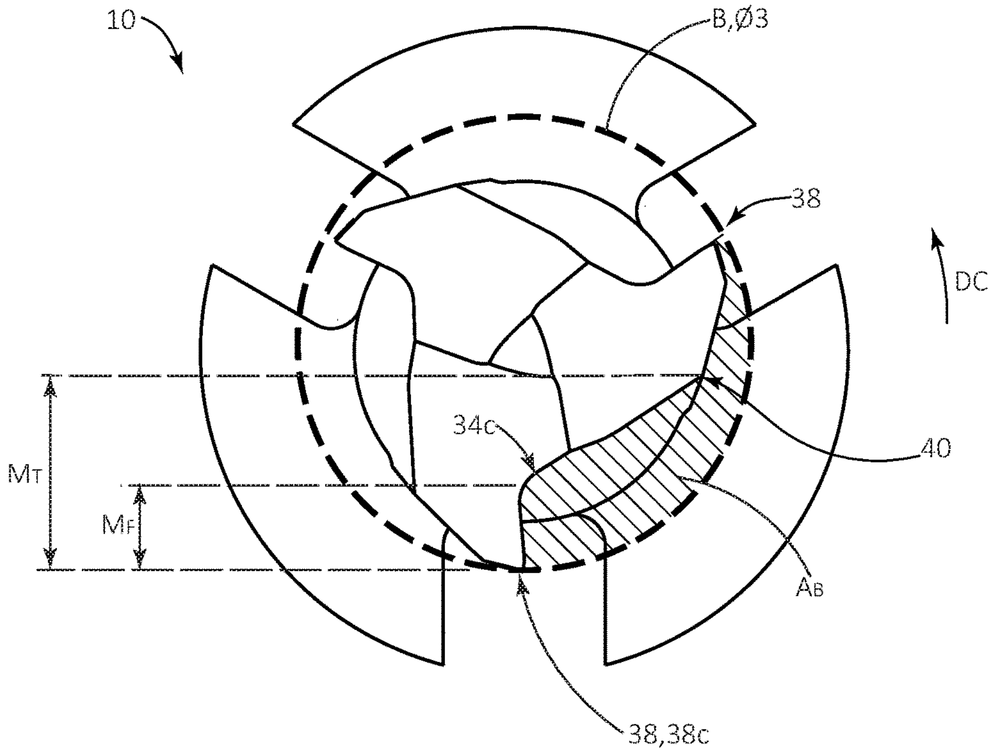
FIG. 9 is a front end view (also called "a view along the central axis in the rearward direction"), along the central axis $A_C$, of the tool in FIG. 1, with a dashed line schematically indicating an internal bore of a workpiece within which the cutting portion of the tool is accommodated, and a hashed section schematically indicating a bore area $A_B$, perpendicular to a central axis $A_C$ and at an imaginary plane at the front end, between the cutting portion and the internal bore.
Figure 10:
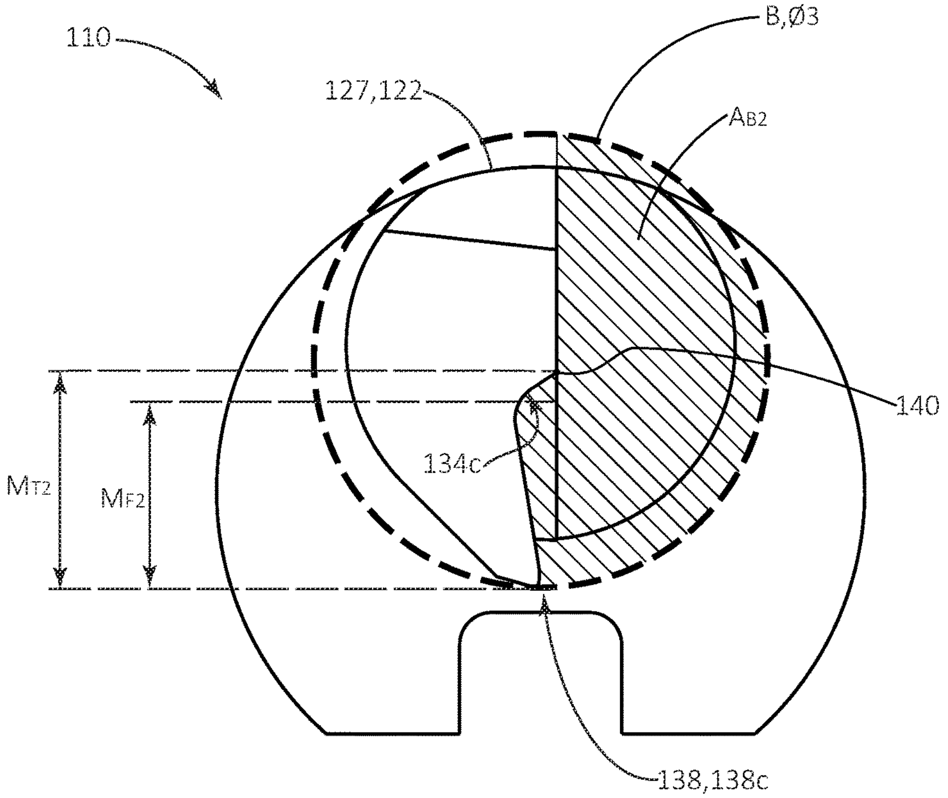
Fig. 10 PRIOR ART
FIG. 10 is a front end view, along a central axis $A_{C2}$, of the prior art tool in FIG. 7, with a similar dashed line and hashed section to that described in connection with FIG. 9.

To elaborate on the importance of chip evacuation, attention is now drawn to FIGS. 9 and 10, respectively schematically showing the cutting portions of the tool 10 and the prior art tool 110 within an exemplary workpiece's bore B having an exemplary bore diameter ø3 of 2.8 mm.

Hereinbelow, some comparative sizes will be discussed.

Regarding the tool 10, a forwardmost cutting sub-edge measurement $M_F$, measured from the nose cutting sub-edge 38*c* of an operative cutting edge 38 contacting the bore B to the start of the concave rake sub-surface 34*c*, is, in this example, 0.5 mm. A transition measurement MT, measured from said nose cutting sub-edge 38*c* to the transition corner 40, is, in this example, 1.2 mm. The chip evacuation space shown schematically as a bore area $A_B$, is from one cutting edge 38 to another in the cutting direction and is, in this example, approximately 17% of the area of the imaginary plane PI within the bore B.

By comparison, prior art tool 110 has relative comparative dimensions, as follows: a forwardmost cutting sub-edge measurement $M_{F2}$ is 1.15 mm. A basically comparative transition measurement $M_{T2}$, even though there is no additional cutting edge, is 1.3 mm. The chip evacuation space shown schematically as a bore area $A_{B2}$, is approximately 49% of the area of the imaginary plane PI within the bore B.

Thus, even with tremendously reduced chip evacuation space and a seemingly smaller cutting edge or rake surface, the tool 10 still provides similar, and surprisingly successful (given the smaller chip evacuation space), material removal performance to the prior art tool 110, while at the same time maintaining sufficient rigidity.

It will be understood that given the incredibly small difference between the tool outer diameter $O_D$ and the bore B, that this is no simple matter.

The above dimensions will now be similarly discussed independent of a reference to a workpiece or bore B.

Referring to FIG. 11 the dashed line refers to the outer cutting diameter Op and the hashed section schematically indicates a void area $A_V$, perpendicular to a central axis $A_C$ and at an imaginary plane at the front end, between the cutting portion and bounded by a circular segment SC defined by the outer cutting diameter $O_D$.

Regarding the tool 10, a forwardmost cutting sub-edge measurement $M_F$, measured from the nose cutting sub-edge 38*c* of an operative cutting edge 38 contacting the bore B to the start of the concave rake sub-surface 34*c*, is 0.5 mm. A transition measurement MT, measured from said nose cutting sub-edge 38*c* to the transition corner 40, is 1.2 mm. The chip evacuation space shown schematically as a bore area $A_B$, is from one cutting edge 38 to another in the cutting direction and is approximately 17% of the area of the imaginary plane PI within the bore B.

The description above includes an exemplary embodiment which does not exclude non-exemplified embodiments from the claim scope of the present application.

What is claimed is:

1. A miniature internal boring tool comprising:
- a shank portion;
- a cutting portion extending from the shank portion; and
- a central axis extending through a center of the shank portion and cutting portion;
- the central axis defining:
  - a cutting direction;
  - a forward direction from the shank portion towards the cutting portion;
  - a rearward direction opposite to the forward direction;
  - an outward direction extending perpendicular to, and outward from, the central axis; and
  - an inward direction opposite to the outward direction;

the shank portion comprising:

a rear end; and a peripheral shank surface extending from the rear end to the cutting portion;

the peripheral shank surface comprising:

two to four shank flat surfaces; and two to four shank curved surfaces;

the shank flat surfaces and the shank curved surfaces alternating about the central axis;

the cutting portion comprising:

a neck portion extending from the shank portion to the cutting portion;

a gashed portion extending forward from the neck portion;

a front end; and an imaginary plane perpendicular to the central axis and located at the front end;

the gashed portion comprising:

two to four integrally formed and angularly spaced apart teeth extending further in the outward direction than the neck portion; and a plurality of gashes;

each tooth comprising:

a rake surface;

a relief surface;

a cutting edge extending along an intersection of the rake surface and relief surface; and the relief surface comprising:

a forwardmost relief sub-surface; and a rearwardmost relief sub-surface;

the cutting edge comprising:

a forwardmost cutting sub-edge extending along the intersection of the rake surface and forwardmost relief sub-surface;

a rearwardmost cutting sub-edge extending along the intersection of the rake surface and rearwardmost relief sub-surface; and a nose cutting sub-edge connecting the forwardmost cutting sub-edge and the rearwardmost cutting sub-edge;

a transition corner is formed between the rake surface of at least one of the teeth and the relief surface of the adjacent tooth to said at least one of the teeth, said adjacent tooth being located further in the cutting direction from said rake surface;

wherein:

outermost points of the cutting edges in the outward direction define an outer cutting diameter ($O_D$) fulfilling: $2\text{ mm}<O_D<9\text{ mm}$; and the nose cutting sub-edge of each of the teeth constitutes the outermost points and further constitutes forwardmost points of the tool.

2. The miniature internal boring tool according to claim 1, wherein in a view perpendicular to the rake surface of one of the teeth, the forwardmost cutting sub-edge of that tooth extends in the forward direction and subtends an external attack angle $A_E$ with the imaginary plane PI, fulfilling the condition: $4°<A_E<16°$.

3. The miniature internal boring tool according to claim 2, fulfilling the condition: $6°<A_E<12°$.

4. The miniature internal boring tool according to claim 3, fulfilling the condition: $6°<A_E<10°$.

5. The miniature internal boring tool according to claim 1, further fulfilling the condition: $2\text{ mm}<O_D<6\text{ mm}$.

6. The miniature internal boring tool according to claim 5, further fulfilling the condition: $2.5\text{ mm}<O_D<4\text{ mm}$.

7. The miniature internal boring tool according to claim 1, comprising exactly three shank flat surfaces and exactly three teeth and the outer cutting diameter ($O_D$) fulfills the condition: $2\text{ mm}<O_D<6\text{ mm}$.

8. The miniature internal boring tool according to claim 1, wherein a total number of gashes of the plurality of gashes corresponds exactly to a total number of the angularly spaced apart teeth.

9. The miniature internal boring tool according to claim 1, wherein one of the plurality of gashes has a gash length $L_G$ parallel to central axis, and the neck has a neck length $L_N$ parallel to central axis, the gash length $L_G$ fulfilling the condition $L_G<0.35\ L_N$.

10. The miniature internal boring tool according to claim 9, wherein the gash length $L_G$ fulfills the condition $L_G<0.25\ L_N$.

11. The miniature internal boring tool according to claim 9, wherein the gash length $L_G$ fulfills the condition $L_G<0.22\ L_N$.

12. The miniature internal boring tool according to claim 1, wherein the rake surface of one of the teeth comprises:

a front rake sub-surface extending between the forwardmost cutting sub-edge, the rearwardmost cutting sub-edge and the nose cutting sub-edge;

a concave rake sub-surface, extending from and further in the inward direction from the front rake sub-surface; and a rear rake sub-surface extending from and further in the inward direction from the concave rake sub-surface;

wherein, in a view along the central axis in the rearward direction, the rear rake sub-surface extends in a basic straight path to the transition corner of the tooth adjacent thereto in the cutting direction.

13. The miniature internal boring tool according to claim 12, wherein, in a view along the central axis in the rearward direction, the transition corner includes a discontinuity between adjacent surfaces.

14. The miniature internal boring tool according to claim 1, wherein, in a view along the central axis in the rearward direction, the transition corner includes a discontinuity between adjacent surfaces.

15. The miniature internal boring tool according to claim 1, comprising exactly three shank flat surfaces and exactly three teeth, wherein in a view along the central axis in the rearward direction, at the front end coinciding with the imaginary plane, a void area $A_V$ defined between two adjacent cutting edges and bounded by a circular segment SC defined by outer cutting diameter $O_D$ fulfills the condition: $0.10O_D<A_V<0.25O_D$.

16. The miniature internal boring tool according to claim 15, further fulfilling the condition: $0.12O_D<A_V<0.22O_D$.

17. The miniature internal boring tool according to claim 16, further fulfilling the condition: $0.14O_D<A_V<0.20O_D$.

18. The miniature internal boring tool according to claim 1, wherein the shank flat surfaces extend until the rear end.

19. The miniature internal boring tool according to claim 1, wherein each shank flat surface is axially aligned with and forms a right angle with a respective rake surface of one of the teeth.

20. The miniature internal boring tool according to claim 1, wherein the tool is 120° rotationally symmetric.

21. The miniature internal boring tool according to claim 1, wherein each of the shank curved surfaces is cylindrically-shaped.

* * * * *